No. 809,861. PATENTED JAN. 9, 1906.
C. M. TAYLOR, Jr.
SUCTION APPARATUS FOR DAIRY PRODUCTS.
APPLICATION FILED JULY 22, 1904.
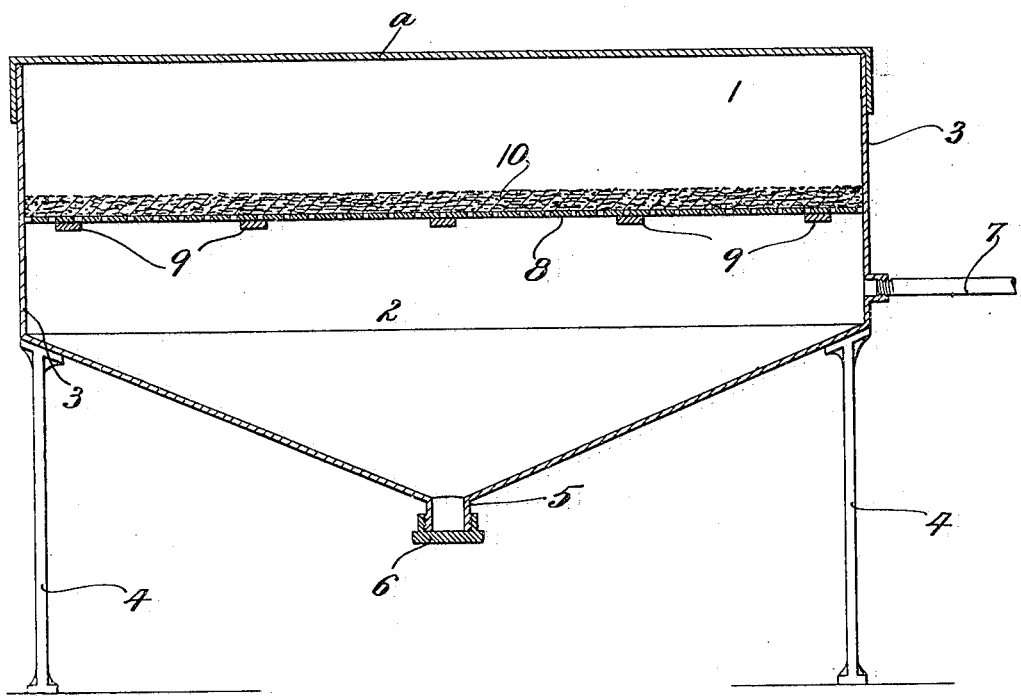

UNITED STATES PATENT OFFICE.

CHARLES M. TAYLOR, JR., OF PHILADELPHIA, PENNSYLVANIA.

SUCTION APPARATUS FOR DAIRY PRODUCTS.

No. 809,861.  Specification of Letters Patent.  Patented Jan. 9, 1906.

Continuation of application Serial No. 127,942, filed October 20, 1902. This application filed July 22, 1904. Serial No. 217,649.

*To all whom it may concern:*

Be it known that I, CHARLES M. TAYLOR, Jr., a citizen of the United States, residing at the city of Philadelphia, in the county of Philadelphia and State of Pennsylvania, have invented a new and useful Suction Apparatus for Dairy Products, of which the following is a specification.

The object of the present invention is to provide neat, compact, cleanly, and efficient means for separating the unbroken fatty globules with or without adherent casein from the free milky portions by the application of pneumatics and without fermentation or agitation.

To this and other ends, hereinafter set forth, the invention comprises the improvements to be presently described and finally claimed.

The nature, characteristic features, and scope of the invention will be more fully understood from the following description, taken in connection with the annexed drawings, forming part hereof, and in which there is illustrated, principally in central section, an apparatus embodying features of the invention.

In the drawing, 1 is a cream-chamber, and 2 is a second or vacuum chamber. A housing 3 incloses these chambers, and it is shown as mounted upon legs or supports 4. The base of the housing is shown to slope toward a discharge-opening 5, provided with a suitable closure 6. The vacuum or second chamber 2 is provided with a connection, as 7, by means of which air is exhausted from it by connecting it with any suitable device adapted to exhaust air.

*a* is a lid or cover fitted to the top of the cream-chamber in such a way as to prevent the access of air.

The exclusion of the outer air to a substantial degree is desirable, because in a place where dairy products abound the air is always more or less infected with bacteria, which induce or promote fermentation, and the exclusion of air secures greater certainty in the product and a greater degree of uniformity in its condition.

The cream-chamber and the second chamber are separated by a detachable and removable perforated or reticulated plate 8.

9 designates transversely-ranging rods or carriers which support the plate 8.

Superposed upon the plate 8 is a layer of material 10, permeable by the fluid constituents of the cream and impermeable by the fatty constituents thereof. An example of such a material is blotting-paper or layers thereof.

It is obvious that with the exception of part 10 the whole apparatus may be made of metal, and therefore readily cleaned.

In use cream is placed in the compartment 1 and the air-pressure in the chamber 2 is made lower than the air-pressure in the compartment 1. Under these conditions the material 10, being impermeable by the fatty constituents, retains them upon its upper surface, while the fluid constituents permeate it, and the effect of the relative difference in air-pressure between the chambers facilitates the removal of the fluid constituents from the under face of the layer 10, so that they fall from it into the chamber 2 and may be subsequently withdrawn by aid of the outlet 5. The fatty constituents are collected from the upper surface of the sheet 10 for use. In this way the described action of the sheet 10 is promoted and the separation is made with comparative rapidity and without opportunity for fermentation and under conditions free from agitation.

It will be obvious to those skilled in the art to which my invention appertains that modifications may be made in details without departing from the spirit thereof. Hence the invention is not limited further than the prior state of the art may require; but,

Having thus described the nature and objects of my invention, what I claim as new, and desire to secure by Letters Patent, is—

1. Apparatus for making dairy products comprising a housing provided with a cream-chamber and a vacuum-chamber, a perforated support interposed between the two, and a layer of material carried by said perforated support and permeable by the watery and impermeable by the fatty constituents of cream, substantially as described.

2. Means for making a dairy product comprising a housing provided with a cream-chamber and a vacuum-chamber and supports interposed between the two chambers, a perforated sheet detachably carried by said supports, a layer of material superposed on said sheets and permeable by the watery and impermeable by the fatty constituents of cream, substantially as described.

3. Means for making dairy products comprising a housing provided with a lid and with a bottom sloping to a discharge-orifice, a closure for said orifice, supports for the housing, perforated supports dividing the housing into a cream-chamber above and a vacuum-chamber below, exhaust connections for the vacuum-chamber, a layer of material superposed on said supports and permeable by the watery constituents and impermeable by the fatty constituents of cream, substantially as described.

4. Apparatus for making dairy products comprising a cream-chamber, a second chamber, a perforated support between the two, a layer of material carried by said support and permeable by the watery and impermeable by the fatty constituents of cream, and means adapted to create a lower atmospheric pressure in the second chamber than in the first chamber, substantially as described.

In testimony whereof I have hereunto signed my name.

CHARLES M. TAYLOR, Jr.

Witnesses:
WM. J. JACKSON,
K. M. GILLIGAN.